United States Patent
Raghavan et al.

(10) Patent No.: US 9,536,165 B2
(45) Date of Patent: Jan. 3, 2017

(54) FLASH CHARACTERIZATION FOR CAMERA

(75) Inventors: Ajay Raghavan, Mountain View, CA (US); Juan Liu, Cupertino, CA (US); Robert R. Price, Palo Alto, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 0 days.

(21) Appl. No.: 13/472,032

(22) Filed: May 15, 2012

(65) Prior Publication Data

US 2013/0308003 A1 Nov. 21, 2013

(51) Int. Cl.
G06K 9/32 (2006.01)
H04N 5/235 (2006.01)
H04N 5/225 (2006.01)
H04N 17/00 (2006.01)

(52) U.S. Cl.
CPC ............ *G06K 9/325* (2013.01); *H04N 5/2354* (2013.01); *G06K 2209/15* (2013.01); *H04N 5/2256* (2013.01); *H04N 17/002* (2013.01)

(58) Field of Classification Search
CPC .. G06K 9/325; G06K 2209/15; H04N 5/2354; H04N 17/002; H04N 5/2256

USPC .................................. 348/221.1, 222.1, 371
See application file for complete search history.

(56) References Cited

U.S. PATENT DOCUMENTS

| | | | |
|---|---|---|---|
| 6,535,636 B1 | 3/2003 | Savakis et al. | |
| 7,693,304 B2 | 4/2010 | Obrador et al. | |
| 7,742,200 B2 | 6/2010 | Eschbach et al. | |
| 7,751,622 B2* | 7/2010 | Cahill et al. | 382/181 |
| 2005/0195290 A1* | 9/2005 | Takeshita | 348/223.1 |
| 2007/0212054 A1* | 9/2007 | Kobayashi | 396/165 |
| 2007/0253695 A1* | 11/2007 | Miyazawa et al. | 396/234 |
| 2010/0086290 A1* | 4/2010 | Noda | 396/177 |

* cited by examiner

*Primary Examiner* — Gevell Selby
(74) *Attorney, Agent, or Firm* — Fay Sharpe LLP

(57) ABSTRACT

A method (100) is provided for characterizing a functionality of a flash (14) from at least one image (200) captured with a camera (12) using the flash (14). The method (100) includes: analyzing the image (200) by segmenting (106) the image (200) into at least one sub-region (206, 208), and applying a metric (108) to the sub-region (206, 208) to measure an image property within the sub-region (206, 208); and determining (110) the functionality of the flash (14) in response to a result of the applied metric.

20 Claims, 4 Drawing Sheets

FLASH CHARACTERIZATION FOR CAMERA

BACKGROUND

The present inventive subject matter relates generally to the art of automated camera systems. Particular but not exclusive relevance is found in connection with red light enforcement and/or other traffic cameras. Accordingly, the present specification makes specific reference thereto. It is to be appreciated however that aspects of the present inventive subject matter are also equally amenable to other like applications.

To capture high quality images, red light, traffic and/or other like automated camera systems commonly use one or more flashes or illumination devices to illuminate regions or objects of interest when ambient light is low, e.g., at night time or when there are cloudy or overcast conditions. Without sufficient illumination, objects of interest such as vehicles, drivers and/or license plates, may not be accurately visualized and/or identifiable in images captured by the camera system. For example, accurate visualization and/or identification of such objects in captured images are often important for law enforcement purposes and/or the issuing of traffic citation.

Over time, flashes, lamps and/or other illumination devices can degrade and ultimately stop functioning altogether. Such failure and/or degradation can result in insufficient illumination when the camera system is capturing an image in a low ambient lighting condition. In turn, one or more objects of interest in such a captured image may not be accurately visualized and/or identifiable. For example, a typical flash configuration may include three flash devices—one auxiliary flash to generally illuminate a vehicle, a second license plate flash to illuminate a vehicle's license plate and a third flash to illuminate a driver of the vehicle. Sufficient degradation and/or failure of any one of these flashes when the camera system is obtaining an image in low ambient lighting conditions may result in insufficient illumination of the target object in the captured image such that the target object is not well visualized and/or not readily identifiable in the captured image. Accordingly, enforcement or other actions reliant on accurate visualization and/or identification of one or more such objects in the captured image may be frustrated.

Traditionally, operators of automated camera systems such as those mentioned above relied on human labor-intensive practices to monitor, check and/or verify proper flash operation. For example, an operator may periodically or intermittently conduct a manual review of images obtained from a camera system and visually inspect them for flash failures. Such an operator may commonly be assigned a significant number of cameras to check on a fairly frequent basis. Accordingly, such a process can be repetitive and prone to human oversight and/or error. Furthermore, such manual visual inspection is not conducive to tracking gradual flash degradation over time as subtle changes in illumination may not be readily apparent upon casual visual inspection of the images. Additionally, a maintenance technician may be assigned to manually inspect and/or conduct live tests of the flash devices in the field at periodic or intermittent intervals. Again, this is a labor-intensive process prone to human oversight and/or error.

Accordingly, a new and/or improved method, system and/or apparatus for monitoring, detecting, reporting and/or forecasting flash degradation and/or failure in automated and/or other camera systems is disclosed which addresses the above-referenced problem(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for characterizing a functionality of a flash from at least one image captured with a camera using the flash. The method includes: analyzing the image by segmenting the image into at least one sub-region, and applying a metric to the sub-region to measure an image property within the sub-region; and determining the functionality of the flash in response to a result of the applied metric.

In accordance with another embodiment, an apparatus is provided that executes the above method.

In accordance with yet another embodiment, a non-transitory machine-readable medium is provided including a computer program which when executed performs the above method.

In accordance with still another embodiment, a camera system includes: at least one flash; a camera that obtains at least one image using the flash; and an image processor that analyzes the image to determine a functionality of the flash. Suitably, the analyzing includes: segmenting the image into at least one sub-region; and applying a metric to the sub-region to measure an image property within the sub-region.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

Figure 1:
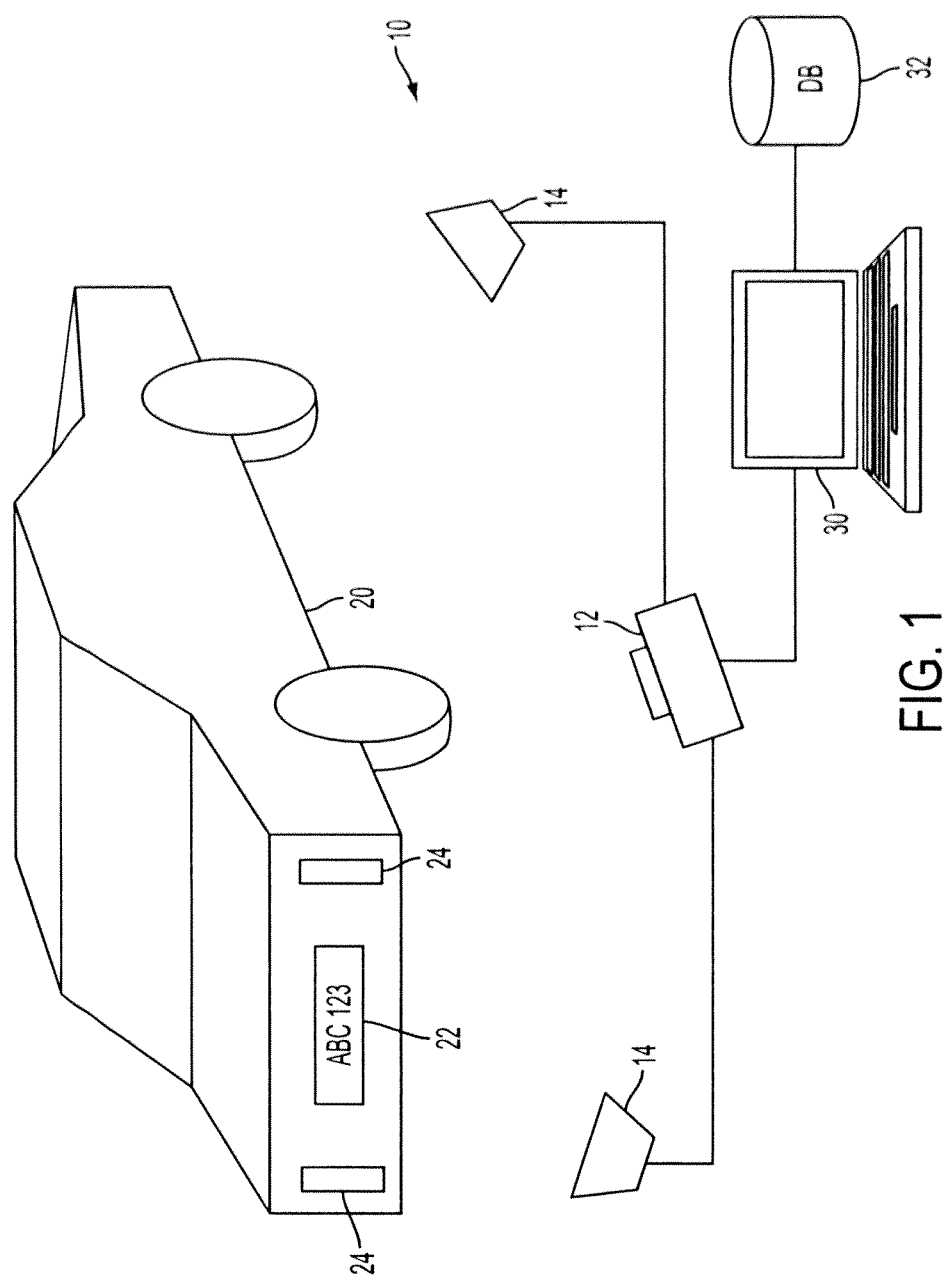
FIG. 1 is a diagrammatic illustration showing an exemplary camera system suitable for practicing aspect of the present inventive subject matter.

With reference now to FIG. 1, an automated camera system 10 includes a camera 12 and a plurality of flashes 14 for selectively illuminating target objects within a field of view of the camera 12 when the camera 12 is capturing an image during a low ambient light condition. In practice, the camera 12 may be a digital camera and may be either a still picture camera or a video camera. When referring herein to a captured or otherwise obtained image from the camera 12, it is intended to mean an image from a picture camera or a still frame from a video camera.

As shown, there are two flashes 14. For example, one flash 14 may be aimed to generally illuminate the body of a vehicle 20 within the field of view of the camera 12, and another flash 14 may be aimed to illuminate the license plate 22 of that vehicle. In practice, however, there may be more or less flashes aimed to illuminate any of a variety of different target objects or regions. Suitably, the flashes 14 are synchronized with the camera 12 and provide illumination when an image is being capture by the camera 12 in a low ambient light condition, e.g., at night time or during cloudy or overcast conditions. Alternately, other illuminations devices, e.g., such a lamps or the like, may be employed to provide substantially continuous illumination during low ambient light conditions.

In the illustrated embodiment, the system 10 further includes a computer 30 or the like that is remotely or otherwise in communication with the camera 12. Suitably, the computer 30 obtains or otherwise receives and analyzes images captured by the camera 12 in order to automatically monitor, detect, report and/or forecast degradation and/or failure of the flashes 14. In practice, the image obtained or received and analyzed by the computer 30 is a digital image, e.g., captured by a digital camera. Optionally, the computer 30 may receive an analog feed which is in turn digitized to obtain a digital image for analysis. In one suitable embodiment, the computer 30 obtains or receives and analyzes essentially all the images captured by the camera 12. Alternately, the computer 30 may obtain or receive and analyze a representative sample or other subset of the images captured by the camera 12 at periodic or intermittent intervals or otherwise chosen times. Suitably, the images may be transmitted from the camera 12 to the computer 30 and/or analyzed in real time or near real time or in batches or otherwise.

Figure 2:
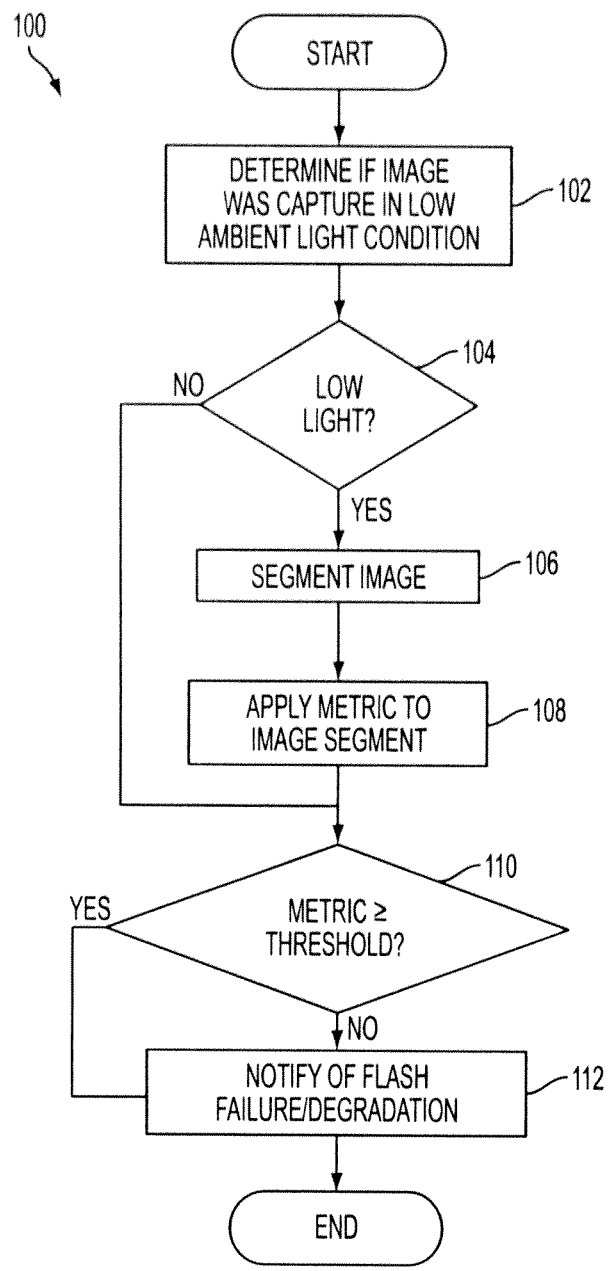
FIG. 2 is a flow chart illustrating an exemplary process for analyzing an image in accordance with aspects of the present inventive subject matter.

With reference now to FIG. 2, there is shown a flow chart illustrating an exemplary process 100 by which the obtained or captured images are analyzed, e.g., by the computer 30. For purposes of the present example, reference is also made to FIG. 3 which shows an exemplary image 200 captured by the camera system 10 and that may be so analyzed.

As shown in step 102, it is detected whether or not the image being analyzed was captured in a low ambient light condition. Suitably, this may be done by measuring a darkness of the image at or around the periphery thereof. For example, the periphery of the image may be defined as some set or otherwise determined distance or amount in from an outermost one or more edges 202 of the image, and a luminance value or the like of pixels in the periphery region of the image may be summed or averaged or otherwise processed to measure or quantify the darkness (or lack of brightness) in the periphery region of the image. In one suitable embodiment, the periphery region may be defined as the upper and lower quarters of the image, e.g., as shown in FIG. 3 by the hashed regions 204.

As decision step 104, if it is determined that the image was not captured in a low ambient light condition, then the process 100 ends. Otherwise, if it is determined that the image was captured in a low ambient light condition, the analysis continues at step 106.

At step 106, the image being analyzed is segmented, e.g., into one or more segments or sub-regions containing objects of interest. Suitably, at least one segment or sub-region is defined for each flash 14 of the camera system 10. Optionally, an image segment or sub-region may be predefined, or alternately, an image segment or sub-region may be dynamically defined based on objects or cues detected and/or otherwise recognized within the image itself. In one suitable embodiment, a first predefined image segment or sub-region may be the middle half or portion of the image, e.g., as indicated in FIG. 3 by the region 206. For example, this segment may correspond to a region generally illuminated by an auxiliary flash 14 which is aimed to generally target the body of the vehicle 20.

Figure 3:
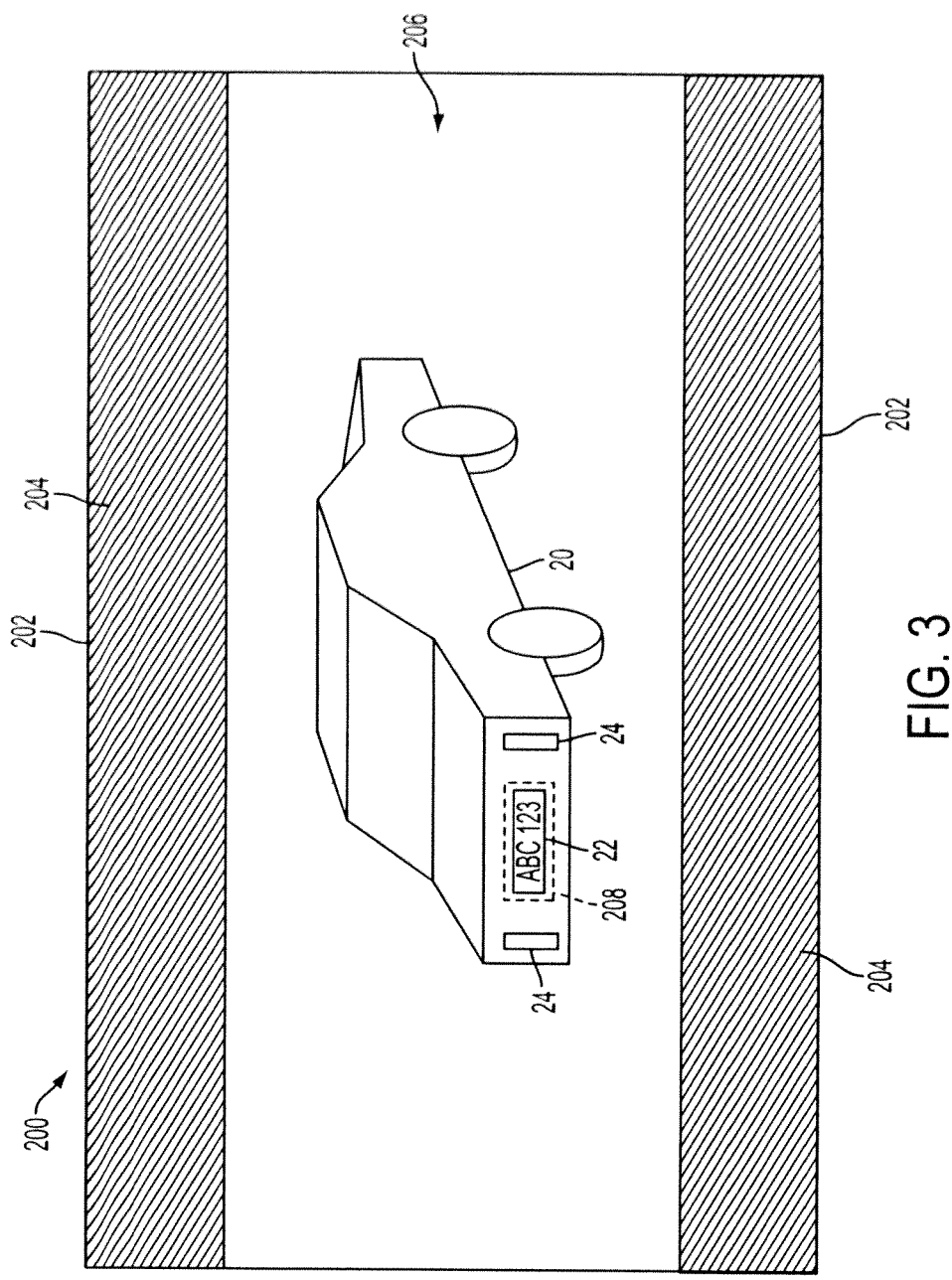
FIG. 3 is a diagrammatic illustration showing an exemplary image analyzed in accordance with aspect of the present inventive subject matter.

A second image segment or sub-region (e.g., as indicated in FIG. 3 by the region 208) may correspond to a region generally illuminated by another flash 14 which is aimed to generally target the license plate 22 of the vehicle 20. Suitably, this second image segment or sub-region may be dynamically defined based on objects or cues detected and/or otherwise recognized within the image itself. For example, the computer 30 may be programmed or otherwise provisioned to detect and/or find a vehicle's taillights 24 within the image being analyzed. That is to say, the image may be searched or otherwise analyzed to find and/or detect a suitable number or collection of pixels or a suitable area in the image consistent with being a taillight. For example, such pixels or areas may be detected and/or found which are of a suitable color (e.g., red) and/or have a suitable size (e.g., x pixels by y pixels) and/or are in a suitable location (e.g., within the region 206) such that they likely correspond to the vehicle's taillights 24. Accordingly, once the objects or cues are discovered and/or recognized within the image, the segment or sub-region 208 may be defined relative thereto. For example, the segment or sub-region 208 may be defined as a box or other area defined at a given location and/or size arranged between the detected taillights 24. Since the segment or sub-region 208 in this case is dynamically defined relatively to objects or cues identified in the specific image being analyzed, it is to be appreciated that from image to image, the segment or sub-region 208 may not always be in the same absolute location or have the same absolute size or shape. Rather, the size, location and/or shape of the segment or sub-region 208 may vary dynamically from analyzed image to analyzed image depending on where the one or more objects or cues are found in the analyzed images.

At step 108, an image property or metric is measured and/or applied in and/or to each segment or sub-region. In one suitable embodiment, the measured or otherwise determined image property or metric reflects or represents the contrast within the segment. For example, assuming an analyzed image Im is represented in a Red-Green-Blue (RGB) color space with a segmented portion of interest $Im_{seg}$, then a suitable contrast metric C may be given by:

$$C(Im_{seg}) = \text{std2}(\text{rgb2gray}(Im_{seg})) \quad (1)$$

where rgb2gray( ) is an operator that converts a color image to monochrome and std2( ) is a standard deviation operator for two-dimensional (2D) images over the segmented image.

Of course, in practice other contrast metrics could be used. For example, it may be possible to use a Weber contrast metric $C_W$ of the form:

$$C_W(Im_{seg}) = 1 - [Y_f(Im_{seg})/Y_b(Im_{seg})] \quad (2)$$

where $Y_f$ is the mean luminance of the foreground and $Y_b$ is the mean luminance of the background. Suitably, in this case, background subtraction may be previously applied.

As still another option, it is possible to use the std2( )operator directly on the color image, e.g., without conversion to monochrome. In this case, the metric is strictly speaking not measuring contrast, but is rather indicative of color richness in the image segment. Nevertheless, in this particular instance, such a measurement is acceptable, since the failure mode of interest generally results in a color-poor image with dark (or low pixel intensity values) for the foreground and background.

Figure 4:
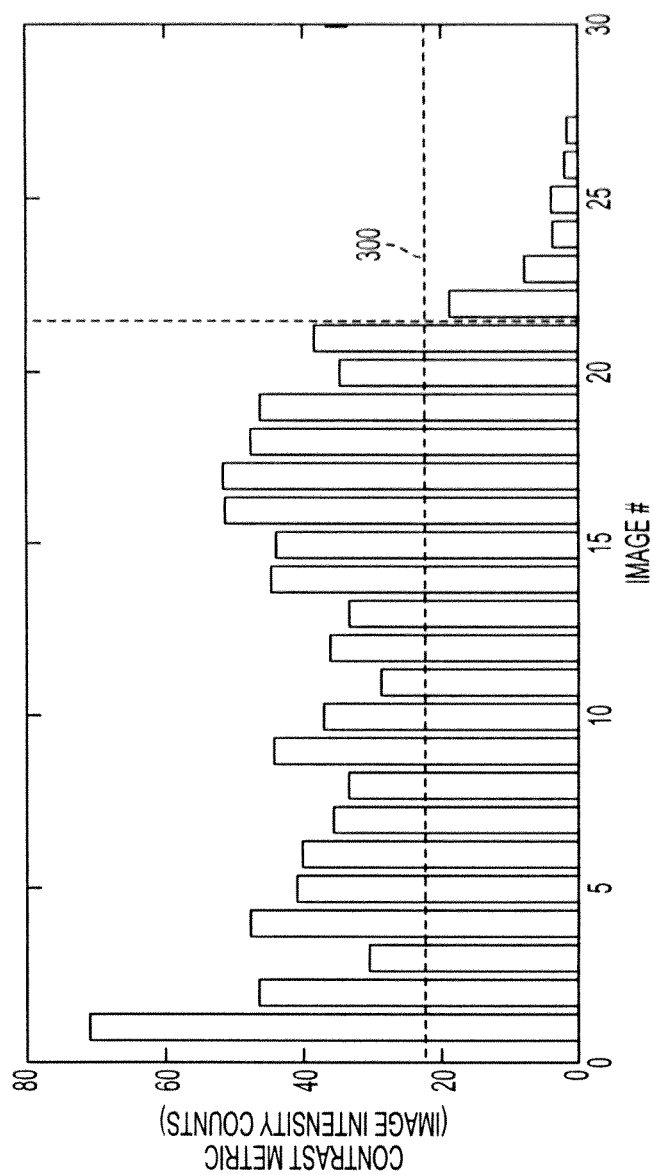
FIG. 4 is a bar graph showing exemplary results of a metric being applied to image segments corresponding to operational and failed/degraded flashes in order to obtain a threshold for use in image analysis according to aspects of the present inventive subject matter.

Suitably, at step 110, the measured image property or metric is compared to a set or otherwise determined threshold. Depending upon whether or not the threshold is met or exceeded or the result of the metric is otherwise within a given range, it is decided whether or not the respective flash 14 associated with the image segment under consideration has failed or has sufficiently degraded so as to merit attention. Suitably, the respective threshold and/or range limits may be set or determined based upon known historical or a priori data relating the metric or measured image property to flash failure/degradation. For example, FIG. 4 shows a bar graph in which 27 image segments were subjected to a contrast metric such as the contrast metric C identified above, or in this case image intensity counts. For image segments 1-21, the associated flash was known to be in good operational order. Conversely, for image segments 22-27, the associated flash was known to have failed or be significantly degraded. Accordingly, it can be seen that a suitable threshold 300 may be defined which universally distinguishes (at least in this case) a good operational flash from a failed/degraded flash based upon whether or not the metric result is above or below the threshold 300 for the image segment associated with the flash in question.

Consequently, if the threshold condition is met (e.g., if the result of the contrast metric C meets or exceeds the threshold level), then the flash associated with the image segment under consideration is deemed to be suitably functional and the analysis/process may end. Otherwise, if the threshold condition is not met (e.g., if the result of the contrast metric C is below the threshold level), then the flash associated with the image segment is deemed to have failed or be sufficiently degraded so as to merit attention. Consequently, at step 112, a suitable notification of the failure/degradation is provided. For example, the computer 30 may provide such a notification by way of a visual indication, audible signal, display or sending of a suitable message, activation of a humanly perceivable alert or alarm, etc.

Optionally, the computer 30 may include or have access to a database or other suitable data storage device 32 in which the measured image property or metric for one or more image segments associated with particular flashes are maintained. In this way, a historical record is maintained of the metric over time for a particular flash. Accordingly, the trend of the metric over time is established. Suitably, the computer 30 may follow or otherwise monitor the trend or changing of the metric over time. Optionally, the monitored trend is fitted and/or compared to a model in order to predict and/or forecast when the associated flash will fail or become sufficiently degraded so as to merit attention. Suitably, the computer 30 may provide or otherwise output such a prediction or forecast in a humanly perceivable manner. For example, consider a contrast metric C that is generally declining over time at some rate. It is possible then to extrapolate the decline of the contrast metric C into the future and observe at what time the extrapolated contrast metric C falls below the relevant threshold. Accordingly, that time may be deemed the forecast or predicted point of failure.

The above elements, components, processes, methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, analysis, methods, functions, elements and/or components described herein may suitably be implemented via hardware, software, firmware or a combination thereof. For example, the computer 30 may include a processor, e.g., embodied by a computing or other electronic data processing device, that is configured and/or otherwise provisioned to perform one or more of the tasks, steps, processes, analysis, methods and/or functions described herein. For example, the computer 30 or other electronic data processing device employed in the system 10 may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for characterizing a functionality of a flash from at least one image captured with a camera using the flash, said method comprising:
    analyzing the image, said analyzing of the image comprising:
        segmenting the image into at least one sub-region; and
        applying a metric to the sub-region to measure an image property within the sub-region; and
    determining an operational condition of the flash in response to a result of the applied metric, said operational condition being either one of (a) a first operational condition in which the flash is functional enough to provide a sufficient amount of illumination therefrom or (b) a second operational condition in which the flash is degraded enough to not provide a sufficient amount of illumination therefrom.

2. The method of claim 1, said method further comprising: determining if said image was captured in a low ambient light condition, and based thereon either executing or not executing said analyzing.

3. The method of claim 1, wherein the metric obtains a standard deviation of pixel values within the sub-region.

4. The method of claim 1, wherein the sub-region is predefined.

5. The method of claim 1, said method further comprising: detecting at least one cue in the image; and defining the sub-region dynamically based on said cue.

6. The method of claim 1, said method further comprising: analyzing a plurality of images captured using said flash over a period of time, and based on said analysis forecasting how functional the flash will be at some future point in time.

7. An apparatus that executes the method of claim 1.

8. A non-transitory machine-readable medium including a computer program which when executed performs the method of claim 1.

9. A method for characterizing a functionality of a flash from at least one image captured with a camera using the flash, said method comprising:
    analyzing the image, said analyzing of the image comprising:
        segmenting the image into at least one sub-region; and
        applying a metric to the sub-region to measure an image property within the sub-region; and
    determining how functional the flash is, in response to a result of the applied metric;
    wherein said method further comprises:
        determining if said image was captured in a low ambient light condition, and based thereon either executing or not executing said analyzing; and
    wherein determining if said image was captured in a low ambient light condition comprises:
        measuring a darkness of the image in at least one periphery region of the image.

10. The method of claim 9, wherein the image is deemed to have been captured in a low ambient light condition, if the measured darkness in the periphery region of the image exceeds a set level.

11. A method for characterizing a functionality of a flash from at least one image captured with a camera using the flash, said method comprising:
    analyzing the image, said analyzing of the image comprising:
        segmenting the image into at least one sub-region; and
        applying a metric to the sub-region to measure an image property within the sub-region; and
    determining how functional the flash is, in response to a result of the applied metric;
    wherein said metric measures at least one of a contrast or a color richness of the image within the sub-region.

12. The method of claim 11, wherein if the result of said metric at least one of meets or exceeds a threshold level, then the flash is deemed to be suitably functional.

13. The method of claim 11, wherein if the result of said metric does not at least one of meet or exceed a threshold level, then the flash is deemed to not be suitably functional.

14. The method of claim 13, said method further comprising:
    providing a notification if the flash is deemed to not be suitably functional.

15. A method for characterizing a functionality of a flash from at least one image captured with a camera using the flash, said method comprising:
    analyzing the image, said analyzing of the image comprising:
        segmenting the image into at least one sub-region; and
        applying a metric to the sub-region to measure an image property within the sub-region; and
    determining how functional the flash is, in response to a result of the applied metric;
    wherein the captured image is a color image, and the method further includes converting at least the sub-region of the image from color to monochrome.

16. A camera system comprising:
at least one flash;
a camera that obtains at least one image using said flash; and
an image processor that analyzes said image to determine an operational condition of said flash, wherein said analyzing includes:
  segmenting the image into at least one sub-region; and
  applying a metric to the sub-region to measure an image property within the sub-region;
  wherein, in response to the measured image property, said operational condition is determined to be either one of (a) a first operational condition in which the flash is functional enough to provide a sufficient amount of illumination therefrom or (b) a second operational condition in which the flash is degraded enough to not provide a sufficient amount of illumination therefrom.

17. The camera system of claim 16, wherein said image processor further:
detects at least one cue in the image; and
defines the sub-region dynamically based on said cue.

18. A camera system comprising:
at least one flash;
a camera that obtains at least one image using said flash; and
an image processor that analyzes said image to determine how functional said flash is, wherein said analyzing includes:
  segmenting the image into at least one sub-region; and
  applying a metric to the sub-region to measure an image property within the sub-region;
wherein said metric measures at least one of a contrast or a color richness of the image within the sub-region.

19. The camera system of claim 18, wherein if a result of said metric at least one of meets or exceeds a threshold level, then the flash is deemed by the image processor to be suitably functional.

20. The camera system of claim 18, wherein the image processor provides a notification if the flash is not deemed to be suitably functional.

* * * * *